(12) United States Patent
Manovit et al.

(10) Patent No.: US 8,219,946 B1
(45) Date of Patent: Jul. 10, 2012

(54) METHOD FOR CLOCK GATING CIRCUITS (75) Inventors: Chaiyasit Manovit, Mt. View, CA (US); Wanlin Cao, Sunnyvale, CA (US); Sridhar Narayanan, Cupertino, CA (US); Sridhar Subramanian, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 223 days.

(21) Appl. No.: 12/835,638

(22) Filed: Jul. 13, 2010

(51) Int. Cl.
*G06F 17/50* (2006.01)

(52) U.S. Cl. ........................ 716/104; 716/106

(58) Field of Classification Search .................... 716/104
See application file for complete search history.

(56) References Cited

OTHER PUBLICATIONS

Babighian, Pietro; Benini, Luca; Macii, Enrico; "A Scalable Algorithm for RTL Insertion of Gated Clocks Based on ODCs Computation," Jan. 2005, IEEE Transactions on Computer-Aided Design of Integrated Circuits and Systems, vol. 24.*
Fraer, Ranan; Kamhi, Gila; Mhameed, Muhammad K.; "A New Paradigm for Synthesis and Propagation of Clock Gating Conditions," Jun. 8, 2008, ACM.*
Babighian, Pietro et al., "A Scalable Algorithm for RTL Insertion of Gated Clocks Based on OCDs Computation," *IEEE Transactions on Computer-Aided Design of Integrated Circuits and Systems*, Jan. 2005, pp. 29-42, IEEE, Piscataway, New Jersey, USA.

Fraer, Ranan et al., "A New Paradigm for Synthesis and Propagation of Clock Gating Conditions" *Proc. of Design Automation Conference* (DAC 2008), Jun. 8, 2008, pp. 658-663, Anaheim, California, USA.
Hurst, Aaron P., "Fast Synthesis of Clock Gates from Existing Logic" *Proc. of the 16th International Workshop on Logic & Synthesis* (IWLS 2007), May 2007, pp. 1-6, San Diego, California, USA.
Chaiyasit Manovit, Sridhar Narayanan and Sridhar Subramanian, *Design and Verification Challenges of ODC-based Clock Gating*, Jan. 26, 2009, pp. 1-11, slides presented at the 46th Design Automation Conference (DAC 2009), San Francisco, California, USA.

* cited by examiner

*Primary Examiner* — Vuthe Siek
*Assistant Examiner* — Eric Lee
(74) *Attorney, Agent, or Firm* — LeRoy D. Maunu; Lois D. Cartier (57) ABSTRACT

In one embodiment, a method is provided for generating clock gating circuitry for a circuit design model. A Boolean expression of path sensitization is determined for each gate element in the netlist of a circuit design. For each gate element, a conjunction of the Boolean expression of the path sensitization and a Boolean expression of a disjunction of the observability conditions of one or more subsequent gates is determined to produce an intermediate Boolean expression. Intermediate Boolean expressions are backward retimed to produce the respective Boolean expression of the observability conditions of the each gate element. Clock gating circuits that implement the respective Boolean expression of the observability conditions of one or more of the plurality of interconnected gate elements are generated and incorporated into the circuit design model.

19 Claims, 4 Drawing Sheets

METHOD FOR CLOCK GATING CIRCUITS

FIELD OF THE INVENTION

The disclosed embodiments generally relate to clock gating of circuits.

BACKGROUND

Clock gating is a well-understood power optimization technique employed in both ASIC and FPGA designs to eliminate unnecessary switching activity and power dissipation without modifying logical operation of the circuit. Clock signals are often used within ASIC and programmable logic integrated circuits (IC) to control the timing of switching events. Each sub-circuit within an IC may be clocked by a single distributed clock signal, for example, to provide synchronized processing. In some cases, however, not all sub-circuits within a circuit are required to be active at all times. For example, certain logic may not be needed to produce output at times when the output is not used by subsequent logic. In these instances, the sub-circuits that implement the logic do not require a continuous clock signal. Continuously providing a clock signal to a sub-circuit that does not require the continuous clock signal adds unnecessarily to the power consumption of the IC. For example, in CMOS implemented logic, the switching activity of the circuit determines the average power dissipation of the circuit. Average power dissipation can be computed by estimating the average switching activity. As such, designers may gate clock signals to avoid unnecessary switching and thereby reduce power consumption.

Clock gating generally requires designers to manually add gating logic to their design code to disable unnecessarily active elements. However, several issues make the manual addition of clock gating logic a difficult process. In determining gating logic care must be taken to ensure that circuit elements continue to produce logically correct output. This often requires intimate knowledge of the design itself and typically requires numerous changes to the design. Because circuit designs implemented in ASICs and programmable ICs often incorporate legacy and third party IP design cores, developers generally do not have sufficient familiarity with the design cores to manually develop meaningful clock-gating logic in a time-efficient manner. Unless the gains in power efficiency are sufficient and essential to the success of the design, the additional complexity and time can be prohibitive and may introduce unintended errors into the design.

The embodiments of the present invention may address one or more of the above issues.

SUMMARY

In one embodiment, a method is provided for generating clock gating circuitry for a circuit design model. A netlist of the circuit design model includes a plurality of gate elements arranged in a number of levels beginning with a first gate element in a first level, the first gate element being a flop gate element, and each subsequent level including one or more second gate elements receiving an input signal directly or transitively from a third gate element included in a previous level. For each one of a plurality of interconnected gate elements in the netlist, a respective Boolean expression of observability conditions is determined for each third gate element by: 1) determining a Boolean expression of path sensitization of the second gate element from an input to an output of the second gate element; 2) determining a Boolean expression of path sensitization from the third gate element to the second gate element; 3) for the third gate element, determining a conjunction of the Boolean expression of the path sensitization of the second gate element, the Boolean expression of path sensitization from the third gate element to the second gate element, and a Boolean expression of a disjunction of the respective Boolean expressions of observability conditions of the second gate elements in the subsequent level that receive input from the third gate element to produce an intermediate Boolean expression; 4) for the second gate element being in the last level, assigning a logic one as the Boolean expression of observability conditions of the second gate element; and 5) performing backward retiming of the intermediate Boolean expression to produce the respective Boolean expression of the observability conditions of the first gate element. Clock gating circuits that implement the respective Boolean expression of the observability conditions of one or more of the plurality of interconnected gate elements are generated and incorporated into the circuit design model.

In another embodiment, the steps included in determining the Boolean expression of the observability conditions for the plurality of interconnected gate elements are performed recursively starting with the first gate element.

The steps included in determining the Boolean expression of the observability conditions for the plurality of interconnected gate elements are performed topologically in another embodiment.

In another embodiment, Boolean expression of the observability conditions of one or more of the plurality of gate elements are approximated to decrease complexity of the Boolean expression.

The approximating the Boolean expression results in an approximated expression representing a number of observability conditions that is greater than or equal to the number of observability conditions represented by Boolean expression in another embodiment.

In another embodiment, the approximating the Boolean expression includes evaluating the netlist to determine a probability that each observability condition will affect a final value of the Boolean expression. One or more of the observability conditions having a lowest probability of affecting the final value are removed from the Boolean expression.

The approximating reduces a number of levels needed to implement the Boolean expression of the observability condition to a selected number of levels in another embodiment.

In another embodiment, evaluating the netlist includes simulating the netlist.

The number of levels is limited to a selected depth threshold in another embodiment.

In another embodiment, the number of gate elements included in each level is limited to a selected breadth limit.

A Boolean expression of input toggle conditions for one or more flop gates in the plurality of interconnected gate elements is also determined in another embodiment. The generating of clock gating circuits that implement the respective Boolean expression of the observability conditions also implements a conjunction of the Boolean expression of the observability condition with the Boolean expression of the input toggle conditions for each gate of the plurality of interconnected gate elements.

In another embodiment, the Boolean expression of input toggle conditions of each of the one or more flop gates is the non-inverting path sensitization along the feedback path from the flop gate output to the flop gate input.

The Boolean expression of input toggle conditions of each of the one or more flop gates accounts for two or more sensitized paths in another embodiment.

In another embodiment, the Boolean expression of the input toggle conditions of one or more of the plurality of gate elements is approximated to decrease complexity of the Boolean expression of the input toggle conditions without decreasing the number of input toggle conditions represented by the Boolean expression.

In another embodiment, a method for generating clock gating circuitry for a circuit design model includes, for each one of a plurality of interconnected flop gates in a first netlist of the circuit design model, determining a respective first Boolean expression of input don't toggle (IDT) conditions. Each respective first Boolean expression is determined by determining, for each flop gate (X) in the transitive fan-in cone of flop gate (Y), a respective second and third Boolean expressions. The second Boolean expression is a conjunction of a non-inverting path sensitization from X to the input of Y, a one flop delay of the non-inverting path sensitization from X to the input of Y, and the Boolean expression of the IDT conditions of X. The third Boolean expression is a conjunction of a non-inverting path sensitization from an inverted output of X to the input of Y, a one flop delay of the non-inverting path sensitization from an inverted output of X to the input of Y, and the Boolean expression of the IDT conditions of X. A disjunction of the respective second Boolean expressions with respective third Boolean expressions and with a non-inverting path sensitization from the output of Y to the input of Y is determined to produce the respective first Boolean expression of the IDT conditions. The respective first Boolean expressions of the IDT conditions of one or more of the plurality of interconnected flop gates is inverted to produce respective Boolean expressions of input toggle conditions. A second circuit design model implementing the input toggle conditions is generated, and a second netlist that incorporates the second circuit design model with the first circuit design model is generated. The non-inverting path sensitization from X to the input of Y is determined by determining positive and negative co-factors of the path from X to the input of Y, and the conjunction of the positive co-factor is determined by an inversion of the negative co-factor in another embodiment.

In another embodiment, the Boolean expression for each input toggle condition is independent of the output of the respective flop gate.

The Boolean expressions of the input toggle conditions are approximated to decrease complexity of the Boolean expressions in another embodiment.

In another embodiment, approximating the Boolean expressions results in an approximated expression representing a number of input toggle conditions that is greater than or equal to the number of input toggle conditions represented by Boolean expression before approximation.

In another embodiment, a method of generating clock gating circuitry for a circuit design model is provided. For each one of one or more flop gates in a first netlist of the circuit design model a respective a Boolean expression of input don't toggle (IDT) conditions by performing the steps of: determining a positive cofactor and a negative cofactor of a path from the output of the flop gate to the input of the flop gate; and determining a Boolean expression of a disjunction of the negative cofactor with an inversion of the positive cofactor.

An article of manufacture is provided in another embodiment. The article is characterized by a processor-readable storage medium configured with processor-executable instructions causing one or more processors to process a circuit design, the instructions when executed by a processor causing the processor to perform a number of operations. The instructions are configured to cause the processor to generate a netlist of the circuit design model. The netlist includes a plurality of gate elements arranged in a number of levels beginning with a first gate element in a first level and each subsequent level including one or more gate elements receiving an input signal directly from a gate element included in the previous level. For each one of a plurality of interconnected gate elements in the netlist the instructions cause the processor to determine a respective Boolean expression of observability conditions by performing the steps including: determining a Boolean expression of path sensitization of the gate element; and for the gate element being in a level other than a last level of the number of gate levels, determining a conjunction of the Boolean expression of the path sensitization of the gate element and a Boolean expression of a disjunction of the respective Boolean expressions of observability conditions of the gate elements in the subsequent level that receive input from the gate element to produce an intermediate Boolean expression. The gate element being in the last level, is assigned the Boolean expression of path sensitization as the intermediate Boolean expression. The instructions further cause the processor to perform backward retiming of the intermediate Boolean expression to produce the respective Boolean expression of the observability conditions of the gate element. The instructions further cause the processor to generate clock gating circuits that implement the respective Boolean expression of the observability conditions of one or more of the plurality of interconnected gate elements, and incorporate the clock gating circuits into the circuit design model.

It will be appreciated that various other embodiments are set forth in the Detailed Description and Claims which follow.

DETAILED DESCRIPTION

Power consumption is often a major constraint in chip designs. One technique for power optimization in digital circuits is clock gating. Clock gating disables logically unused elements of a circuit to reduce the active power consumption while maintaining the desired functionality and level of performance. In order to ensure correct operation, gating logic must be carefully designed to avoid disabling elements at times when it may affect output of the circuit. Designing gating logic is generally a manually intensive and complex operation that may be cost prohibitive or introduce errors into the circuit design. Existing methods for generation of clock gating circuitry perform a structural analysis to identify patterns or test for satisfiability conditions. However, these approaches are processor intensive and are limited to functions of existing signals. The disclosure describes a number of efficient methods for automated generation of clock gating circuitry for a circuit design.

The embodiments determine when clock gating may be performed in terms of other signals in the circuit. A combination of signals in which a particular circuit element may be or may not be gated is referred to as a gating condition. Determined gating conditions are then used to generate gating circuitry that dynamically enables and disables particular circuit elements to reduce power usage.

Figure 1:
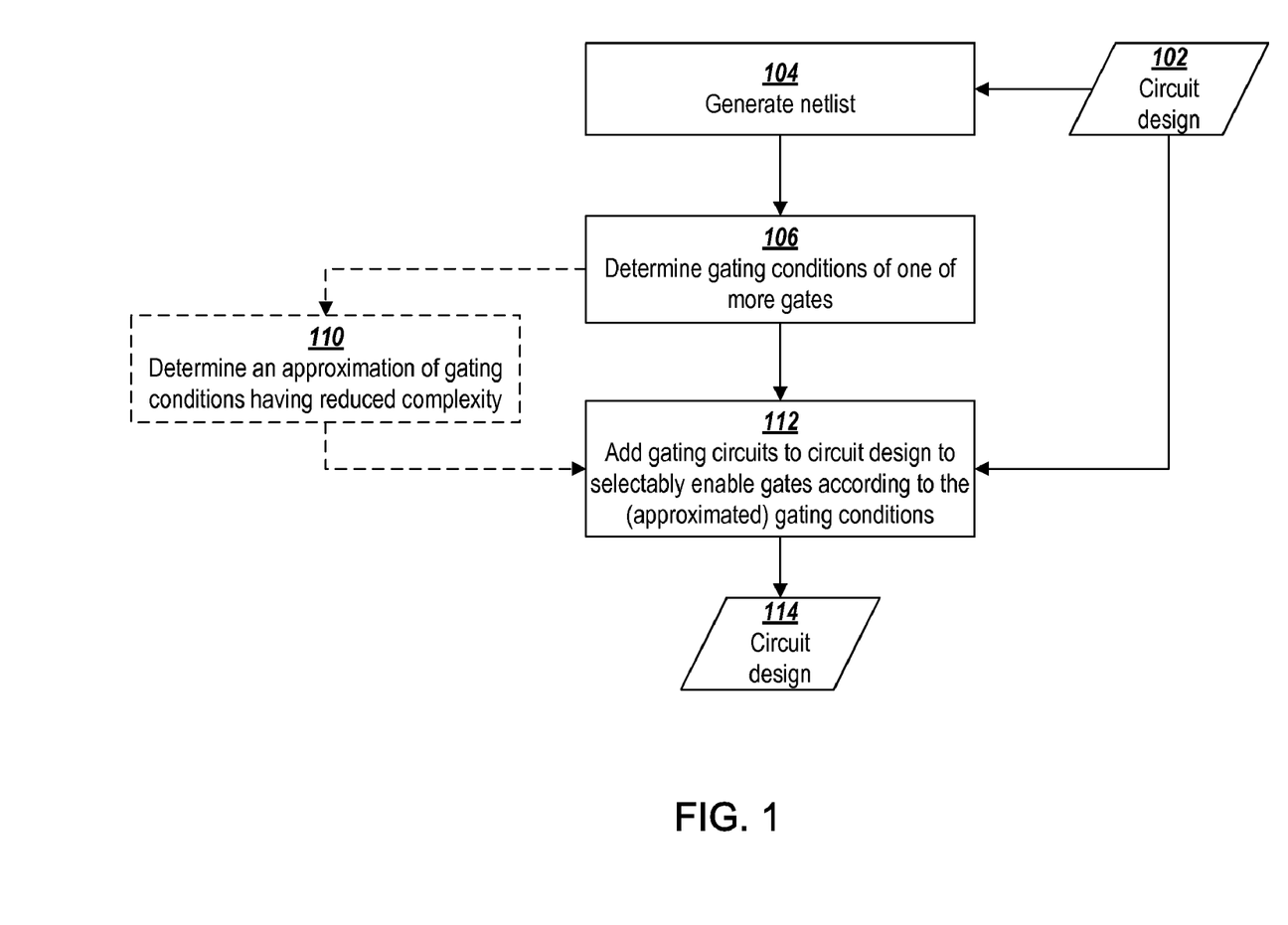
FIG. 1 shows a flowchart of an example process for generating clock gating circuitry for a circuit design in accordance with one or more embodiments.

FIG. 1 shows a flowchart of an example process for generating clock gating circuitry for a circuit design in accordance with one or more embodiments. A netlist is generated from a circuit design 102 at step 104. The netlist is analyzed to determine gating conditions of one or more circuit elements at step 106. Gating circuitry is generated at step 112 to implement the gating conditions as determined in step 106, in circuit design 114. In some implementations, the gating conditions determined at step 106 may be approximated at step 110 to reduce the complexity of the gating conditions.

Figure 2:
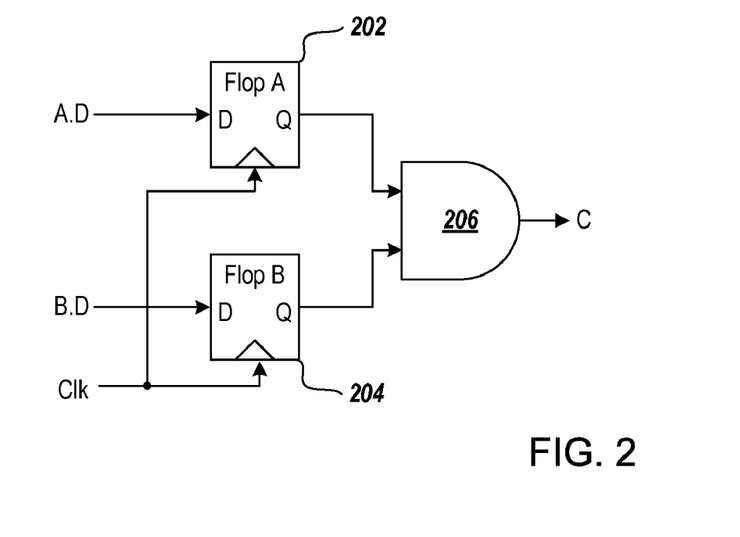
FIG. 2 shows an example circuit that may be modified to incorporate clock gating
Figure 3:
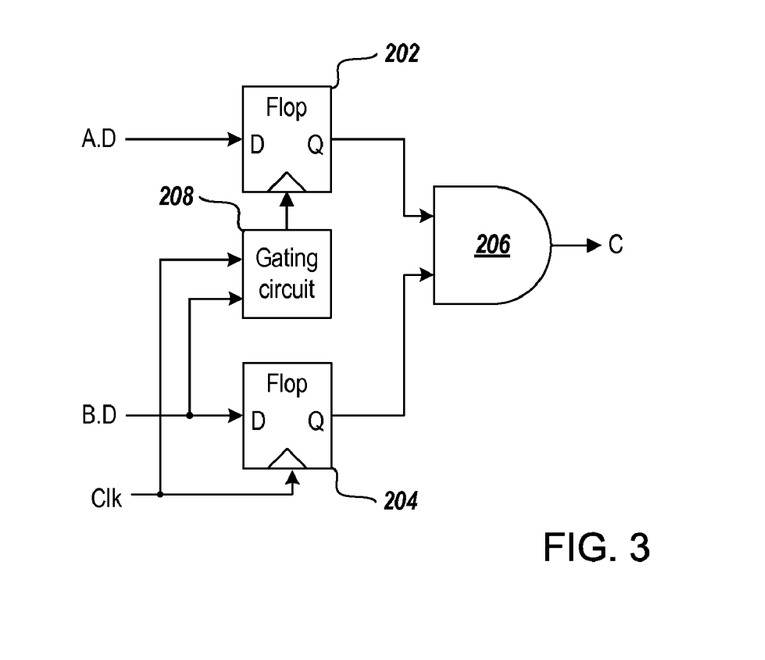
FIG. 3 shows the circuit of FIG. 2 with clock gating circuitry.

In digital circuits, there are often situations where the output of some particular circuit element is irrelevant because it does not affect the output of the overall circuit. FIGS. 2 and 3 illustrate the clock gating of an example circuit. FIG. 2 shows an example circuit of two flop gates 202 and 204 having output coupled to AND gate 206. Each flop gate 202 and 204 is synchronized by a clock signal (CLK). When clocked by the CLK, flop gates 202 and 204 sets the values output to AND gate 206 to be equal to A.D and B.D, respectively. In this example, it can be seen that if the value output by flop gate 204 is equal to one, the output C of AND gate 206 will be equal to the value output by flop gate 202. Therefore, if input B.D is equal to one, flop 202 must be clocked in order for the output C to be equal to input A.D. However, if B.D is equal to zero, the output C of AND gate 206 will be equal to zero regardless of the value of A.D. Therefore, power can be saved by disabling flop-gate 202. FIG. 3 shows the circuit shown in FIG. 2 with clock gating circuit 208 coupled to selectably enable flop gate 202. In this example, the gating circuit is configured to forward the clock signal CLK to flop gate 202 when the input B.D of flop gate 204 is equal to one. When the input B.D of flop gate 204 is equal to zero, the clock signal CLK is not forwarded, and flop gate 202 is effectively disabled. In this manner, particular circuit elements can be disabled when the output of the circuit element does not affect the output of the circuit.

In one embodiment, clock gating is performed to disable a particular circuit element when output of the circuit is not dependent on output of the circuit element. This type of gating condition is referred to as the Observability Don't Care (ODC) condition. Gating conditions may inversely describe when a circuit is to be enabled. The inverse of the ODC, referred to as the Observability condition, describes when one or more outputs of the circuit may be dependent on the output of a particular circuit element. For ease of explanation, the embodiments herein are described in terms of gating conditions used to enable the particular circuit element. One skilled in the art will recognize that enabling gating conditions can be converted to the disabling gating conditions and vice versa.

Observability conditions may be generated for flop gates as well as combinational logic gates in a circuit design. As used herein, the term gate element generically refers to both flop gates and logic gates in a circuit design. For ease of explanation, the methods for and examples of determining observability conditions are described in terms of gate elements using the notation $G.I_j$ to refer to the input $I_j$ and G.O to refer to the output O of a gate element G (in one model, a gate element has only one output and may have multiple inputs).

Two implementations are described for determining the observability conditions of gate elements. The first implementation provides precise observability conditions but may be more computationally intensive than the second implementation. The second implementation determines an approximation of the precise observability conditions in a computationally efficient manner. For ease of explanation, the more accurate observability conditions are referred to a precise observability conditions and the estimated observability conditions are referred to as the scalable observability conditions. Observability conditions may refer to either precise observability conditions or scalable observability conditions.

In the first implementation, the precise observability condition (POC) of the output of a gate element G is determined by considering the sensitizable paths from G.O to all its possible observers and the POC of those observers. If there is a path from U to V, the path sensitization (PS) from U to V is given by the Boolean difference of V with respect to U, as shown by:

$$PS(U \text{ to } V) = V/U \text{ XOR } V/\sim U$$

where (/) indicates the co-factoring operator.

POC of G.O can be determined by the following equation:

$$POC(G.O) = PS(G.O \text{ to } X_1.I_{j1}) * PS(X_1.I_{j1} \text{ to } X_1.O) * POC(X_1) + PS(G.O \text{ to } X_2.I_{j2}) * PS(X_2.I_{j2} \text{ to } X_2.O) * POC(X_2) + \ldots + PS(G.O \text{ to } X_N.I_{jN}) * PS(X_N.I_{jN} \text{ to } X_N.O) * POC(X_N)$$

for gate elements $X_1$ to $X_N$ in the transitive fan-out cone (TFO) of G.O (representing all possible observers of G.O), where (*) indicates the Boolean conjunction and (+) indicates the Boolean disjunction.

For a combinational logic gate element G, POC of G.O directly defines POC of G itself because when G.O is not observable it directly translates to G's inputs also not being observed in the same clock cycle. For a flop gate element F, however, when F.O is not observed, it is not the current input F.I that is not being observed, but rather its value from the previous clock cycle which had been transferred to F.O when the most recent clock arrived. Therefore, POC(F) is defined as the value of POC(F.O) one clock cycle ahead of time, denoted by RetimeBackward(POC(F.O)). In this manner, the POC is retimed to give the condition whether the input F.I should be clocked based on its observability in the next cycle, which is also described in the description of FIGS. 2 and 3. Thus, POC(G)=POC(G.O) if G is a combinational logic gate
POC(G)=RetimeBackward(POC(G.O)) if G is a flop gate
POC(G)=1 if G is a primary output where RetimeBackward( ) transforms a Boolean expression of flop outputs by replacing each flop output with its input. After the retiming, a Boolean expression can be rewritten from a function of inputs to become a function of intermediate nets by expanding the function of each flop input.

In the second implementation, the scalable observability condition (SOC) is an efficient approximation of the POC. The only difference lies in the definition of $X_1$ to $X_N$. In computing POC, $X_1$ to $X_N$ are defined as being in the transitive fan-out cone of G.O. While for SOC, $X_1$ to $X_N$ are defined as being in the immediate fan-out of G.O. This will result in far fewer path sensitizations that need to be computed. One skilled in the art will appreciate that, as a trade-off, $X_1$ to $X_N$ can also be defined as something in between, for example, being in a K-level fan-out of G.O. With this approximation that $X_i$ is in the immediate fan-out of G.O, it means G.O directly drives $X_i.I_{ji}$ and, hence, PS(G.O to $X_i.I_{ji}$) is simply equal to 1. Thus, the equation for SOC is simplified to:

$$SOC(G.O) = PS(X_1.I_{j1} \text{ to } X_1.O) * SOC(X_1) + PS(X_2.I_{j2} \text{ to } X_2.O) * SOC(X_2) + \ldots + PS(X_N.I_{jN} \text{ to } X_N.O) * SOC(X_N)$$

Figure 4:
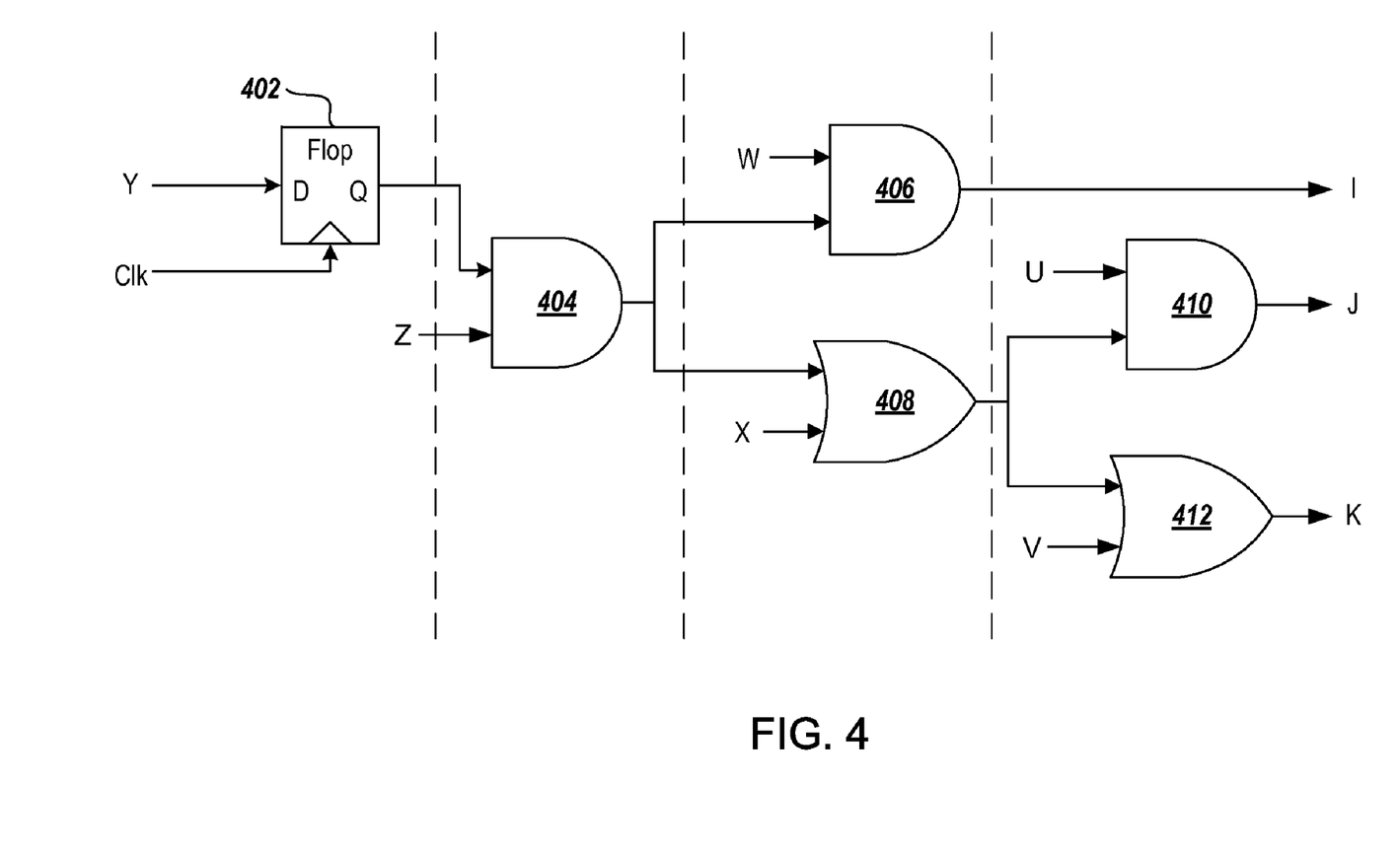
FIG. 4 illustrates an example circuit that may be modified to incorporate clock gating.

An example of this recursive method for determining SOC is demonstrated with reference to the circuit shown in FIG. 4. FIG. 4 shows an example circuit diagram of gate elements arranged in four hierarchical levels, the gate elements having inputs U, V, W, X, Y, and Z and outputs I, J, and K. Y is input to flop gate 402. In this example, other inputs are driven by flop gates (not shown). Outputs I, J, and K are primary outputs, thus, their SOC is 1. Logic gates 404, 406, 408, 410, and 412 are located on paths in the fan-out cone of flop gate 402. In determining the SOC of the output of flop gate 402, the sensitization of the path though each logic gate is determined through recursive expansion as described above. The sensitization though each logic gate is shown in Table 1. In this example, the sensitization of each AND gate is equal to the value input on the other path through the AND gate while the sensitization of OR gates is equal to the inverse of the input on the other path though the gate. For example, the sensitization of AND gate 404 is Z and the sensitization of OR gate 408 is ~X.

TABLE 1

| Gate | 404 | 406 | 408 | 410 | 412 |
|---|---|---|---|---|---|
| Sensitization | Z | W | ~X | U | ~V |

Once leaf nodes (primary outputs) have been reached in the recursive process, SOCs are determined from the sensitization. Beginning at leaf node 412, 410, and 406, the recursive calculation of the SOC is shown in Table 2. The SOC of each gate is equal to the determined sensitization in conjunction with the Boolean sum of the observability condition of gates in the next hierarchical level that receive input from the gate. The SOC of the output of flop gate 402 is equal to the SOC of the input of AND gate 404=Z*(W+~X*(U+~V)).

TABLE 2

| Gate | Scalable Observability Condition (SOC) on the input | Sensitization | SOC on output |
|---|---|---|---|
| 412 | ~V | ~V | 1 |
| 410 | U | U | 1 |
| 408 | ~X * (U + ~V) | ~X | U + ~V |
| 406 | W | W | 1 |
| 404 | Z * (W + ~X * (U + ~V)) | Z | W + ~X * (U + ~V) |

Example 1 shows pseudo-code for performing the method described above for determining observability conditions. The observer set defined on line 7 of Example 1 refers to the gates receiving input from G.O that are included in the analysis. The population of the observer set determines whether the determined observability condition is precise or scalable (or something in between).

1. BooleanExp OC_EN (gate element G)//G can be flop or combinational
2. {
3. If G is marked as being computed
4. Return 1;//prevent infinite recursion
5. Mark G as being computed;
6. BooleanExp OC_EN=0;
7. For each observer I of G.O//I is input pin of gate X
8. OC_EN=OC_EN+(PS(G.O to X.I)*PS(X.I to X.O)* OC_EN(X));
9. Endfor
10. If G is a flop then
11. OC_EN=RetimeBackward(OC_EN);
12. Unmark G;
13. Return OC_EN;
14. }

Example 1

For purposes of comparison, the computation for POC for flop gate 402 in FIG. 4 is shown below. In the example, the POC is equal to the SOC, which is typical and illustrates the efficiency of the SOC.

$$POC(402)=PS(402.O \text{ to } I)+PS(402.O \text{ to } J)+PS(402.O \text{ to } K)$$

$$Z*W+Z*\sim X*U+Z*\sim X*\sim V$$

Example 2 shows pseudo-code for the retiming described above and called by RetimeBackward(OC_EN) in Example 1. The notation, C ? A:B, is equivalent to C*A+~C*B.

1. BooleanExp RetimeBackward(expression E)
2. {
3. For each variable Vi in expression E
4. Wi=Expansion of Vi into a function of only flop outputs $F_1.Q \ldots F_N.Q$;
5. Replace each flop output F.Q in expression Wi with "OC_EN(F) ? F.D:F.Q";
6. Endfor
7. Replace all Vi's with Wi's in expression E;
8. Return the replaced E;
9. }

Example 2

In digital circuits, there are often situations where the output of some flop gates does not change. In these situations, power can be saved by not clocking the flop gate. Because the flop gate will have the same value, functionality is not affected. In one embodiment, clock gating is performed to disable toggling of a flop gate when its input has not changed. This type of gating condition is referred to herein as the input don't toggle (IDT) condition.

For any flop gate F, its input F.D can be expressed as a function of its own output F.Q by the following Shannon's expansion:

$$F.D=F.Q*F.D/F.Q+\sim F.Q*F.D/\sim F.Q$$

where "*" indicates the Boolean conjunction and "+" indicates the Boolean disjunction. IDT(F.D) can then be defined as the Non-inverting Path Sensitization (NIPS) from F.Q to F.D, propagating F.Q to F.D via the first minterm while the second minterm is zeroed out. Therefore, the IDT(F.D) is defined as the non-inverting path sensitization from F.Q to F.D, as given by:

$$IDT(F.D)=F.D/F.Q*\sim(\sim F.Q*F.D/\sim F.Q)$$

If IDT(F.D) is defined independently of F.Q, multiple flop gates may be able to share the same IDT condition. When F.Q is removed from the formula and approximated, IDT(F.D) is defined as:

$$IDT(F.D)=NIPS(F.Q \text{ to } F.D)=F.D/F.Q*\sim F.D/\sim F.Q$$

The IDT conditions may inversely describe when a flop gate is to be enabled. The inverse of the IDT, referred to as the input toggle condition (ITC), describes when the input of a flop gate may be different from its current output. For ease of explanation, example implementations of this embodiment are described in terms of the input toggle condition used to enable a particular flop gate. One skilled in the art will recognize that input toggle conditions can be derived from the IDT conditions as:

$$ITC\_EN(F) = ITC(F.D) = \sim IDT(F.D) = \sim F.D/F.Q + F.D/\sim F.Q$$

The cofactors F.D/F.Q and F.D/~F.Q can be computed using the methods as shown in Example 3.

Example 3 shows pseudo code for determining the ITC_EN. In function Cofactor( ) X is assumed to not be in N's transitive fan-in (TFI) cone when recursion is too deep (recursion depth cut-off) or when the result is too complex (complexity cut-off). This approximation is safe in terms of functionality.

1. BooleanExp ITC_EN(flop F)
2. {
3. BooleanExp cofactor1=Cofactor(F.D by F.Q);
4. BooleanExp cofactor0=Cofactor(F.D by ~F.Q);
5. Return ~cofactor1+cofactor0;
6. }
7. BooleanExp Cofactor(net N by X)//X may be in the form of ~Y
8. {
9. If (N==X) then Return 1;
10. If (N==~X) then Return 0;
11. If X is not in N's TFI//N does not depend on X and ~X
12. Return N;
13. Determine the function F(N1 , . . . , Nn) of net N;
14. For each net Ni of the function F
15. Compute Mi=Cofactor(Ni by X);
16. Endfor
17. Return F(M1 , . . . , Mn);
18. }

Example 3

The ITC condition calculated in the embodiment described above only considers feedback from F.Q to F.D. In one embodiment, IDT(F.D) can be determined recursively to account for additional sensitizable paths in a similar fashion to the recursive method for calculating observability condition described above. If a path is sensitized to an input F.D of flop gate F for two consecutive clock cycles and the source of the path has not changed, the input F.D would not toggle. Therefore, it is not necessary to enable flop gate F. The recursive function for such IDT condition is described as:

$$IDT(F.D) = NIPS(F.Q \text{ to } F.D) + \text{sum of } [\text{flop}(NIPS(X.Q \text{ to } F.D))*NIPS(X.Q \text{ to } F.D)*IDT(X.Q)] + \text{sum of } [\text{flop}(NIPS(\sim X.Q \text{ to } F.D))*NIPS(\sim X.Q \text{ to } F.D)*IDT(X.Q)]$$

for all flop X in F.D's transitive fan-in cone (TFI) except F itself. For each flop gate (X) in the transitive fan in cone of flop gate (F) where X≠F, a respective Boolean expression is determined for a conjunction of: a non-inverting path sensitization from the output of X to the input of F, a one flop delay of the non-inverting path sensitization from the output of X to the input of F, and the Boolean expression of the IDT condition of X's output. Treating X.Q to F.D and ~X.Q to F.D as separate paths, the same is repeated with non-inverting replaced with inverting. The disjunction of the Boolean expressions for each flop gate is performed, together with the non-inverting path sensitization from F's own output to its input, to produce the Boolean expression of the IDT condition. In this process, the non-inverting path sensitization can be determined as described above. The sensitizations from X.Q to F.D and from ~X.Q to F.D are treated as separate paths. IDT on a flop output is defined as a one flop delay of IDT on its input, that is, IDT(X.Q)=flop(IDT(X.D)).

The Boolean expressions of the IDT conditions may be inverted to produce input toggle conditions. One skilled in the art will recognize that some implementations may require new flop gates be added to the design if they do not already exist. Where appropriate, however, the added flops may be combined to decrease area/power penalty, e.g.: f(flop(X), flop(Y))=flop(f(X,Y)).

In another embodiment, IDT conditions may include data dependent input and output signals F.D and F.Q for a flop gate F in the clock enable condition of the flop gate. One example data-dependent IDT condition for flop F is when F.D equals F.Q, e.g.:

$$IDT(F.D) = F.D \text{ XNOR } F.Q.$$

The gating condition may be approximated as:

$$IDT(F.D) = F.D * F.Q \text{ or } IDT(F.D) = \sim F.D * \sim F.Q.$$

For a wide flop gate of multiple bits, a generalization form of above, using & and | bit-reduction operators, gives:

$$IDT(F.D) = \& F.D * \& F.Q$$

or $$IDT(F.D) = \sim |F.D * \sim |F.Q$$

If these functions (or their inversions) already exist in the design, they may be used directly (or with an inversion) for clock gating provided that timing conditions are met. This type of IDT clock gating can be very efficient if there are only few dominant patterns to which the value of (wide) flop F is frequently set and we can generalize it as:

$$IDT(F.D) = \text{sum of } [(F.Q = \text{dominant pattern}) * (F.D = \text{dominant pattern})]$$

or $$IDT(F.D) = \text{sum of } [\text{flop}(F.D = \text{dominant pattern}) * (F.D = \text{dominant pattern})]$$

for all dominant patterns. The above two variants are equivalent because comparing F.Q is logically equivalent to delaying the result of the comparison on F.D (provided that the effect of clock gating on F, if any, is already absorbed in determining the value of F.D). The formulas may be viewed as equivalent because they each indicate when the same value is received at the flop input for two consecutive cycles. In some implementations, the comparison of F.D against a dominant pattern can sometimes be made even less expensive. For example, if F.D[7:0]=valid ? X.Q[7:0]: 8'b0, checking for F.D[7:0]=8'b0 can be approximately reduced to as simple as checking for valid=0. This assumes X.Q is unlikely to be 8'b0 when valid is 1.

The embodiments described above may be used alone or in a number of combinations to generate more efficient gating conditions. Enabling gating conditions may be combined with a logical AND and Disabling gating conditions may be combined with a logical OR. A non-inverting feedback path of a flop F in a design may exist as a result from previous clock gating analysis. In a situation where the feedback path of flop F was introduced as an insertion of its observability condition enable from previous clock gating analysis, including the path in observability condition analysis of F will not invalidate the derived observability condition but will make it suboptimal since the analysis now has to consider flop F as an additional observer of itself. Therefore, it may be desirable to exclude the feedback path of such origin from the circuit for observability condition analysis.

The logic of an optimal gating condition that disables a gate element in every possible instance may be very complex and prohibitively expensive to implement in hardware. However, clock-gating functions in actual circuit implementations need not be exact. Significant power saving may still be achieved using approximated conditions. In addition to reducing the amount of computation, when applied to final clock enables, approximation may help improve the timing of the clock enables by allowing their dependence on timing critical signals to be removed if possible. Approximation may also be necessary if a retimed version of a signal is not available in the circuit. In approximating gating conditions, a gate element may be disabled less often than the exact gating condition but not more. In disabling gating functions, such as ODC and IDT as described above, approximation results in gating conditions that disable a subset of the exact gating conditions. In enabling gating functions, such as observability conditions and input toggle conditions, approximation results in a superset of the exact gating conditions. As an example, a superset approximation of $a*b$ is a because a evaluates to 1 strictly more often than $a*b$ (in other words, $a*b=1$ implies $a=1$). For ease of explanation, the following examples of approximation are described in terms of determining a superset of enabling gating conditions.

In one embodiment, the complexity of gating conditions may be reduced by performing superset approximation of the Boolean gating conditions after the Boolean gating conditions are generated. There are various methods for performing superset approximation. The approximation may be targeted to adjust a number of characteristics including: the number of terms included in each gating condition, the number of logic gates necessary to implement the gating conditions, the number of gate levels necessary to implement the gating conditions, frequency of unnecessary enablement, etc.

In one implementation, superset approximation may be performed with optimizations to retain the efficiency of the clock enable function being approximated so that the clock is not unnecessarily enabled too often. The implementation is premised on the linearity of the superset approximation over Boolean AND and OR. For example, superset($a*b$) can be approximated with superset($a$)*superset($b$).

In one implementation, the gating conditions may be analyzed or simulated to determine the probability that each term of the Boolean gating condition will result in disabling of a particular gate element. For example, probabilities may be used to decide whether to approximate the gating condition $a*b$ with either a or b. Terms identified as having the highest frequency of enablement can be targeted for removal from the Boolean gating condition. This can be used to filter out signals that are mostly irrelevant due to their almost constant nature. If probability $p_1(a)$ is larger than a threshold $th_1$, a may be dropped from $a*b$ and, thus, $a*b$ may be approximated with b, without losing much efficiency (the amount of loss depends on $th_1$). On the other hand, dropping a from $a+b$ makes the approximated result become 1; without approximation, $p_1(a+b)$ is close to 1 anyway because $p_1(a+b) \geq p_1(a) > th_1$. If $p_1(a)$ is smaller than another threshold $th_0$ (most likely, the $=1-th_1$), however, it may be undesirable to drop a from either $a*b$ or $a+b$. However, due to a symmetry with the previous case, a may be dropped from $\sim a*b$ or $\sim a+b$ and b and 1 obtained as the approximated results, respectively.

Once a term is chosen, approximation of the term can be performed by rewriting the Boolean expression of the gating condition according to the Shannon's expansion:

$$f=x*f/x+\sim x*f/\sim x$$

For example, If $p_1(x) > th_1$ and x is to be removed, f may be approximated by dropping x from the first term:

$$f=f/x+\sim x*f/\sim x=f+f/x$$

Conversely, if $p_{1/(x)<th0}$, f may be approximated by dropping $\sim x$ from the second term:

$$f=x*f/x+f/\sim x=f+f/\sim x$$

If simulation and/or analysis determine that x is truly a constant, the expression can be reduced without losing any efficiency:

$$f=f/x (\text{if } x=1) \text{ or } f=f/\sim x (\text{if } x=0)$$

In one embodiment the number of signals used in the Boolean expression of the gating condition is reduced to be less than or equal to a selected number N. The expression f is rewritten as a product of sums $$f=s_1*s_2*s_3* \ldots *s_n$$

The terms may be sorted by some heuristics such as by the size of the terms (number of signals) from small to large, or by probability from high to low. The largest number k of terms is determined such that $s_1 \ldots s_k$ can be retained without exceeding N signals. The product of $s_{k+1} \ldots s_n$ is approximated by first rewriting it as another sum of products:

$$g=s_{k+1}*s_{k+2}* \ldots *s_n=t_1+t_2+t_3+ \ldots +t_m$$

These terms $t_1 \ldots t_m$ may be sorted by some similar heuristics, e.g., by term size from small to large or by probability from high to low. The largest j such that $t_1 \ldots t_j$ can be retained together with $s_1 \ldots s_k$ without exceeding N signals is determined. Structural or recursive approximation may be used on $t_{j+1}+t_{j+2}+ \ldots +t_m$ to obtain h as the approximated result of the remainder. The final approximated result is:

$$f=s_1*s_2*s_3* \ldots *s_k*(t_1+t_2+t_3+ \ldots +t_j+h)$$

In one embodiment, the complexity of gating conditions may be reduced by adjusting the scope of analysis. For example, in one implementation, the observability condition analysis, as well as the input toggle condition analysis, may be configured to limit recursive analysis to a depth of a selected depth threshold indicating a number of gate element levels. The outputs of the gate elements in the last level are treated as outputs of the circuit for purposes of observability condition analysis. In another implementation, the breadth of the recursive algorithm may be limited to a selected breadth threshold indicating a number of gate elements to be included in the observer set indicated in Example 1. In another implementation, the recursive processing may be configured to process gates-elements in a topological order and/or in repeated iterations. This may help mitigate the premature cut-off of the recursion depth and improve the effectiveness of gating conditions. One skilled in the art will recognize that the embodiments may be used alone or in combination to determine gating conditions.

Figure 5:
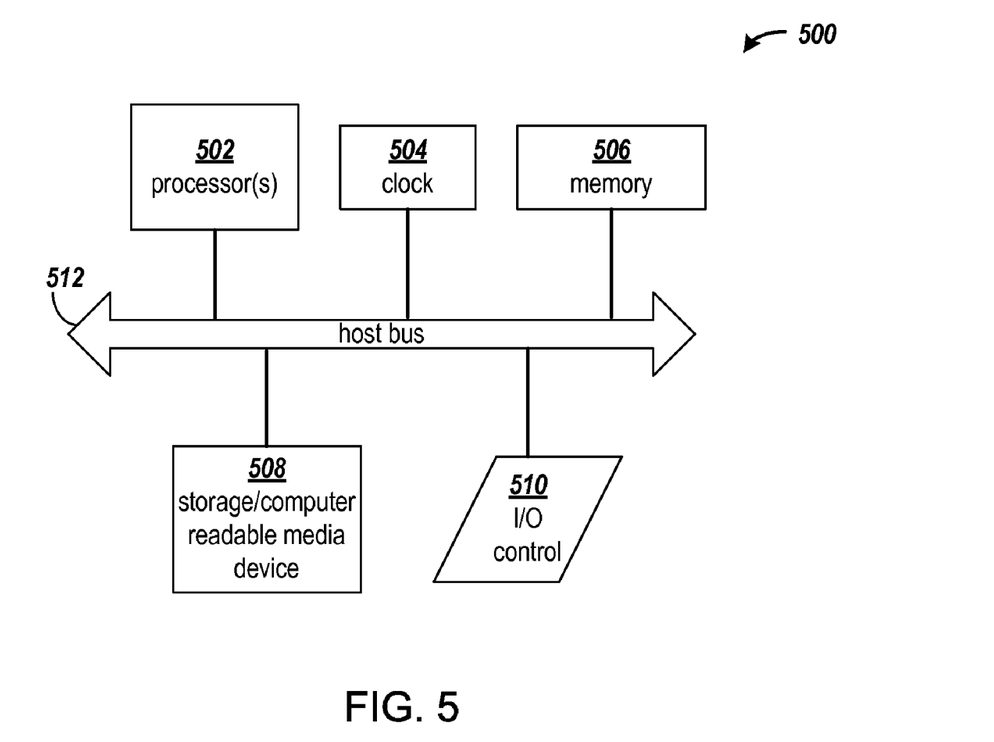
FIG. 5 illustrates a block diagram of an example computing arrangement on which the processes described herein may be implemented using a general purpose processor.

FIG. 5 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the algorithms of the different embodiments. The computer code that implements the processes of the disclosed embodiments are encoded in a processor executable format and may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory unit 506, a storage unit 508, and an input/output control unit 510 coupled to host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, CISC, pipelined, etc.).

The memory arrangement 506 typically includes multiple levels of cache memory, a main memory. The storage arrangement 508 may include local and/or remote persistent storage such as provided by magnetic disks (not shown), flash, EPROM, or other non-volatile data storage. The storage unit may be read or read/write capable. Further, the memory 506 and storage 508 may be combined in a single arrangement.

The processor arrangement 502 executes the software in storage 508 and/or memory 506 arrangements, reads data from and stores data to the storage 508 and/or memory 506 arrangements, and communicates with external devices through the input/output control arrangement 510. These functions are synchronized by the clock signal generator 504. The resource of the computing arrangement may be managed by either an operating system (not shown), or a hardware control unit (not shown).

The present invention is thought to be applicable to a variety of systems for synthesis and clock gating of circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of generating clock gating circuitry for a circuit design model, comprising:
using one or more programmed processors to perform steps including:
for each one of a plurality of interconnected gate elements in a netlist of the circuit design model, the plurality of gate elements arranged in a number of levels beginning with a first gate element in a first level, the first gate element being a flop gate element, and each subsequent level including one or more second gate elements receiving an input signal directly or transitively from a third gate element included in a previous level, determining a respective Boolean expression of observability conditions for the third gate element by performing steps including:
determining a Boolean expression of path sensitization of the second gate element from an input to an output of the second gate element;
determining a Boolean expression of path sensitization from the third gate element to the second gate element;
for the third gate element, determining a conjunction of the Boolean expression of the path sensitization of the second gate element, the Boolean expression of path sensitization from the third gate element to the second gate element, and a Boolean expression of a disjunction of the respective Boolean expressions of observability conditions of the second gate elements in a subsequent level that receive input from the third gate element to produce an intermediate Boolean expression;
for the second gate element being in the last level, assigning a logic one as the Boolean expression of observability conditions of the second gate element; and
performing backward retiming of the intermediate Boolean expression to produce the respective Boolean expression of the observability conditions of the first gate element; and
generating clock gating circuits that implement the respective Boolean expression of the observability conditions of one or more of the plurality of interconnected gate elements, and incorporating the clock gating circuits into the circuit design model.

2. The method of claim 1, wherein the steps included in determining the Boolean expression of the observability conditions for the plurality of interconnected gate elements are performed recursively starting with the first gate element.

3. The method of claim 1, wherein the steps included in determining the Boolean expression of the observability conditions for the plurality of interconnected gate elements are performed topologically.

4. The method of claim 1, further comprising approximating the Boolean expression of the observability conditions of one or more of the plurality of gate elements to decrease complexity of the Boolean expression.

5. The method of claim 4, wherein the approximating the Boolean expression results in an approximated expression representing a number of observability conditions that is >= the number of observability conditions represented by Boolean expression.

6. The method of claim 5, wherein the approximating the Boolean expression includes:
evaluating the netlist to determine a probability that each observability condition will affect a final value of the Boolean expression; and
removing one or more of the observability conditions having a lowest probability of affecting the final value of the Boolean expression.

7. The method of claim 5, wherein the approximating the Boolean expression reduces a number of levels needed to implement the Boolean expression of the observability condition to a selected number of levels.

8. The method of claim 6, wherein the evaluating the netlist includes simulating the netlist.

9. The method of claim 1, wherein the number of levels is limited to a selected depth threshold.

10. The method of claim 1, wherein a number of gate elements included in each level is limited to a selected breadth limit.

11. The method of claim 1, further comprising:
determining a Boolean expression of input toggle conditions for one or more flop gates in the plurality of interconnected gate elements; and
wherein the generating clock gating circuits that implement the respective Boolean expression of the observability conditions implements a conjunction of the Boolean expression of the observability condition with the Boolean expression of the input toggle conditions for each gate of the plurality of interconnected gate elements.

12. The method of claim 11, wherein the Boolean expression of input toggle conditions of each of the one or more flop gates is the non-inverting path sensitization along the feedback path from the flop gate output to the flop gate input.

13. The method of claim 11, wherein the Boolean expression of input toggle conditions of each of the one or more flop gates accounts for two or more sensitized paths.

14. The method of claim 11, further comprising approximating the Boolean expression of the input toggle conditions of one or more of the plurality of gate elements to decrease complexity of the Boolean expression of the input toggle conditions without decreasing the number of input toggle conditions represented by the Boolean expression.

15. A method of generating clock gating circuitry for a circuit design model, comprising:
   for each one of a plurality of interconnected flop gates in a first netlist of the circuit design model, determining a respective first Boolean expression of input don't toggle (IDT) conditions by performing steps using one or more programmed processors, the steps including:
   for each flop gate (X) in the transitive fan-in cone of flop gate (Y):
      determining a respective second Boolean expression of a conjunction of a non-inverting path sensitization from the output of X to the input of Y, a one flop delay of the non-inverting path sensitization from the output of X to the input of Y, and the Boolean expression of the IDT conditions of X;
      determining a respective third Boolean expression of a conjunction of a non-inverting path sensitization from an inverted output of X to the input of Y, a one flop delay of the non-inverting path sensitization from the inverted output of X to the input of Y, and the Boolean expression of the IDT conditions of X; and
      determining a disjunction of the respective second Boolean expressions with respective third Boolean expressions and with a non-inverting path sensitization from the output of Y to the input of Y to produce the respective first Boolean expression of the IDT conditions;
   inverting the respective first Boolean expressions of the IDT conditions of one or more of the plurality of interconnected flop gates to produce respective Boolean expressions of input toggle conditions;
   generating a second circuit design model implementing the input toggle conditions; and
   generating a second netlist that incorporates the second circuit design model with the first circuit design model.

16. The method of claim 15, wherein the non-inverting path sensitization from the output of X to the input of Y is determined by:
   determining positive and negative co-factors of the path from the output of X to the input of Y; and
   determining the conjunction of the positive co-factor by an inversion of the negative co-factor.

17. The method of claim 15, wherein the Boolean expression for each input toggle condition is independent of the output of the respective flop gate.

18. The method of claim 15, further comprising approximating the Boolean expressions of the input toggle conditions to decrease complexity of the Boolean expressions.

19. The method of claim 18, wherein the approximating the Boolean expressions results in an approximated expression representing a number of input toggle conditions that is >= the number of input toggle conditions represented by the Boolean expressions of the input toggle conditions before approximation.

* * * * *